United States Patent
Kawauchi et al.

(10) Patent No.: US 9,268,246 B2
(45) Date of Patent: Feb. 23, 2016

(54) METHOD FOR MANUFACTURING CARRIER CORE PARTICLES FOR ELECTROPHOTOGRAPHIC DEVELOPER, CARRIER CORE PARTICLES FOR ELECTROPHOTOGRAPHIC DEVELOPER, CARRIER FOR ELECTROPHOTOGRAPHIC DEVELOPER, AND ELECTROPHOTOGRAPHIC DEVELOPER

(71) Applicants: DOWA ELECTRONICS MATERIALS CO., LTD., Tokyo (JP); DOWA IP CREATION CO., LTD., Okayama, Okayama (JP)

(72) Inventors: Takeshi Kawauchi, Okayama (JP); Sho Ogawa, Okayama (JP); Haruka Seki, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 15 days.

(21) Appl. No.: 14/184,848

(22) Filed: Feb. 20, 2014

(65) Prior Publication Data
US 2014/0242511 A1     Aug. 28, 2014

(30) Foreign Application Priority Data
Feb. 25, 2013 (JP) ................. 2013-034212

(51) Int. Cl.
| | |
|---|---|
| *G03G 9/107* | (2006.01) |
| *C04B 35/26* | (2006.01) |
| *G03G 9/10* | (2006.01) |
| *G03G 9/113* | (2006.01) |

(52) U.S. Cl.
CPC ............ *G03G 9/107* (2013.01); *C04B 35/2633* (2013.01); *G03G 9/10* (2013.01); *C04B 2235/3208* (2013.01); *C04B 2235/3213* (2013.01); *G03G 9/1132* (2013.01)

(58) Field of Classification Search
CPC . G03G 9/1136; G03G 9/1133; G03G 9/1139; G03G 9/107; G03G 9/10; G03G 9/1131
See application file for complete search history.

(56) References Cited

U.S. PATENT DOCUMENTS 8,865,386 B2 * 10/2014 Kawauchi et al. ....... 430/111.32

FOREIGN PATENT DOCUMENTS

| | | |
|---|---|---|
| EP | 2 555 056 | 2/2013 |
| EP | 2 565 716 | 3/2013 |
| JP | 2006-038961 | 2/2006 |
| JP | 2006-337828 | 12/2006 |
| JP | 2010-243798 | 10/2010 |

* cited by examiner

*Primary Examiner* — Hoa V Le
(74) *Attorney, Agent, or Firm* — Clark & Brody (57) ABSTRACT

Provided is a method for manufacturing carrier core particles for electrophotographic developer capable of stably maintaining high chargeability over a long time. The method for manufacturing carrier core particles includes a granulation step of granulating a mixture of raw materials containing manganese, iron, strontium, and calcium and a firing step of firing the mixture granulated in the granulation step. The firing step includes a heating process of heating the granular mixture with an increase in temperature to a predetermined degree and a cooling process of cooling the granular mixture, after the heating process, in an atmosphere with an oxygen concentration ranging from 5000 ppm to 20000 ppm. The molar ratio of the sum of strontium and calcium to the sum of the manganese, iron, strontium, and calcium is 0.0026 to 0.013.

7 Claims, 4 Drawing Sheets

METHOD FOR MANUFACTURING CARRIER CORE PARTICLES FOR ELECTROPHOTOGRAPHIC DEVELOPER, CARRIER CORE PARTICLES FOR ELECTROPHOTOGRAPHIC DEVELOPER, CARRIER FOR ELECTROPHOTOGRAPHIC DEVELOPER, AND ELECTROPHOTOGRAPHIC DEVELOPER

BACKGROUND OF THE INVENTION

1. Field of the Invention

This invention relates to a method for manufacturing carrier core particles for electrophotographic developer (hereinafter, sometimes simply referred to as "carrier core particles"), the carrier core particles for electrophotographic developer, carrier for electrophotographic developer (hereinafter, sometimes simply referred to as "carrier"), and electrophotographic developer (hereinafter, sometimes simply referred to as "developer"). More particularly, this invention relates to carrier core particles contained in electrophotographic developer used in copying machines, MFPs (Multifunctional Printers) or other types of electrophotographic apparatuses, a method for manufacturing the carrier core particles, carrier in the electrophotographic developer and the electrophotographic developer.

2. Description of the Related Art

Electrophotographic dry developing systems employed in copying machines, MFPs or other types of electrophotographic apparatuses are categorized into a system using a one-component developer containing only toner and a system using a two-component developer containing toner and carrier. In either of these developing systems, toner charged to a predetermined level is applied to a photoreceptor. An electrostatic latent image formed on the photoreceptor is rendered visual with the toner and is transferred to a sheet of paper. The image visualized by the toner is fixed on the paper to obtain a desired image.

A brief description about development with the two-component developer will be given. A predetermined amount of toner and a predetermined amount of carrier are accommodated in a developing apparatus. The developing apparatus is provided with a rotatable magnet roller with a plurality of south and north poles alternately arranged thereon in the circumferential direction and an agitation roller for agitating and mixing the toner and carrier in the developing apparatus. The carrier made of magnetic powder is carried by the magnet roller. The magnetic force of the magnet roller forms a straight-chain-like magnetic brush of carrier particles. Agitation produces triboelectric charges that attract a plurality of toner particles to the surfaces of the carrier particles. The magnetic brush abuts against the photoreceptor with rotation of the magnet roller to supply the toner to the surface of the photoreceptor. Development with the two-component developer is carried out as described above.

Fixation of the toner on a sheet of paper results in successive consumption of toner in the developing apparatus, and new toner in the same amount as that of the consumed toner is supplied, whenever needed, from a toner hopper attached to the developing apparatus. On the other hand, the carrier is not consumed for development and is used as it is until the carrier comes to the end of its life. The carrier, which is a component of the two-component developer, is required to have various functions including: a function of triboelectrically charging the toner by agitation in an effective manner; insulation properties; and a toner transferring ability to appropriately transfer the toner to the photoreceptor.

The recently dominating carrier includes carrier core particles, which are the core or the heart of the carrier particles, and resin that covers the outer surface of the carrier core particles.

The carrier core particles, which are cores of the carrier particles carried on the magnet roller and agitated and mixed in the developing apparatus, are required to have excellent magnetic characteristics and high mechanical strength as well as excellent electrical characteristics in order to improve triboelectric chargeability for the toner. The improvement of the electrical characteristics, that is, triboelectric chargeability for toner mainly have been made by resin that coats the carrier core particles as described above. However, the long-term use of the developer may cause the coating resin to be partially peeled off or may cause fracturing or chipping of the carrier core particles, which expose bare parts of the carrier. This means that long-term use of the developer deteriorates the triboelectric chargeability of the carrier, which is unfavorable.

The carrier core particles are thus required to improve their various characteristics and performance. Especially to improve the triboelectric chargeability, there is a tendency for the carrier core particles to be desired to have a somewhat rough surface rather than a smooth or slick one. Techniques developed by focusing on asperities on the surface of the carrier core particles are disclosed in Japanese Unexamined Patent Application Publications No. 2006-337828 and No. 2010-243798.

SUMMARY OF THE INVENTION

Japanese Unexamined Patent Application Publication No. 2006-337828 shows ferrite carrier core particles for electrophotography that contain manganese ferrite as a principle material and are shaped so as to have appropriate asperities on the surfaces. A part of Fe and Mn of the manganese ferrite composition is substituted with at least one element selected from the group consisting of Mg, Ca, Sr, and Ti, and the sum of the contents thereof is 4 mol % or less. The carrier core particles for electrophotographic developer according to Japanese Unexamined Patent Application Publication No. 2010-243798 substantially does not contain any kind of heavy metal, but Mn. The carrier core particles for electrophotographic developer adopted in the publication contain 0.8% to 5% of Mg by weight, 0.1% to 2.5% of Ti by weight, 60% to 70% of Fe by weight, and 0.2% to 2.5% of Sr by weight, and have surface coating formed by a surface oxidation process, and the shape factor and ratio of surface roughness between before and after the surface oxidation are set within a predetermined range.

However, the carrier core particles disclosed in the aforementioned publications may not sometimes be adaptable to the recent prolonged longevity of the developer. Because the carrier core particles having asperities as disclosed in the publications may have excellent chargeability at the early stage, but may sometimes have difficulties to stably maintain the high chargeability over a long time.

An object of the present invention is to provide a method for manufacturing carrier core particles for electrophotographic developer capable of stably maintaining high chargeability over a long time.

Another object of the present invention is to provide carrier core particles for electrophotographic developer capable of stably maintaining high chargeability over a long time.

Yet another object of the present invention is to provide carrier for electrophotographic developer capable of stably maintaining high chargeability over a long time.

Yet still another object of the present invention is to provide electrophotographic developer capable of stably forming good quality images over long-term use.

SUMMARY

For the purpose of obtaining carrier core particles capable of stably maintaining high chargeability over a long time, the inventors of the present application firstly conceived to use manganese and iron as principle materials of the core composition for ensuring excellent magnetic characteristics as a basic characteristic. The next thing the inventors conceived was to promote formation of magnetoplumbite type, in other words, hexagonal crystal structure in the course of ferritization achieved by firing and sintering for the purpose of forming appropriate asperities over the surface of the carrier core particles to stably maintain high chargeability over a long time. To promote the magnetoplumbite type crystal structure, the inventors conceived to add a predetermined amount of strontium to synthesize strontium ferrite in part during the firing step. In addition, the inventors contemplated increasing the degree of the asperity by making the crystals grow upright, in other words, in the direction of the outside diameter of the crystals (assuming that the crystals are spherical) in the course of ferritization achieved by firing and sintering. As a specific method for the upright growth, the inventors conceived to add a predetermined amount of calcium to precipitate calcium oxide at grain boundaries of the crystals. Furthermore, the inventors diligently examined the balance between the degree of the asperities on the surface of the carrier core particles and the influence to the mechanical strength caused by substituted elements other than manganese and iron in the crystal structure, more specifically, strontium and calcium. The inventors defined the range of the sum of strontium and calcium contents to the sum of the whole metal element contents and also defined the range of oxygen concentration in a cooling process of the firing step, thereby finally having achieved the carrier core particles with appropriate asperities on the surface that maintain excellent electrical characteristics over a long term while securing high mechanical strength and excellent magnetic characteristics.

Specifically, the present invention is directed to a method for manufacturing carrier core particles for electrophotographic developer which include manganese and iron as a core composition. The method includes a granulation step of granulating a mixture of a raw material containing manganese, a raw material containing iron, a raw material containing strontium, and a raw material containing calcium and a firing step of firing the granular mixture granulated in the granulation step. The firing step includes a heating process of heating the granular mixture with an increase in temperature to a predetermined degree and a cooling process of cooling the granular mixture in an atmosphere with an oxygen concentration ranging from 5000 ppm to 20000 ppm. The molar ratio of the sum of strontium and calcium to the sum of manganese, iron, strontium, and calcium is 0.0026 to 0.013.

The method for manufacturing the carrier core particles can provide carrier core particles with appropriate asperities formed on the surface to maintain excellent electrical characteristics over a long time while ensuring high mechanical strength and excellent magnetic characteristics.

The carrier core particles composed as described above can be expressed, except for minutely small doses of strontium and calcium, by a general formula: $Mn_xFe_{3-x}O_{4+y}$ ($0<x\leq1$, $0<y$). As is apparent from the formula, the carrier core particles contain a slightly excess amount of oxygen as expressed by $0<y$.

A method for calculating an oxygen amount y will be described. Before calculating the oxygen amount y, Mn is assumed to be divalent in the present invention. First, the average valence of Fe is calculated. The average valence of Fe is obtained by quantitatively determining $Fe^{2+}$ and total Fe through oxidation-reduction titration and then calculating the average valence of Fe from the resultant quantities of $Fe^{2+}$ and $Fe^{3+}$. The method for quantitatively determining $Fe^{2+}$ and total Fe will be described in detail.

(1) Quantification of $Fe^{2+}$

First, ferrite that contains iron elements is dissolved in a hydrochloric acid (HCl) solution, which is reducible acid in carbon dioxide bubbling. Secondly, the amount of $Fe^{2+}$ ion in the solution is quantitatively analyzed through potential difference titration with potassium permanganate solution, thereby obtaining the titer of $Fe^{2+}$.

(2) Quantification of Total Fe

Iron-element containing ferrite, which weighs the same amount as the ferrite used to quantitatively determine $Fe^{2+}$, is dissolved in mixed acid solution of hydrochloric acid and nitric acid. This solution is evaporated to dryness, and then a sulfuric acid solution is added to the solution for redissolution to volatilize excess hydrochloric acid and nitric acid. Solid Al is added to the remaining solution to reduce the $Fe^{3+}$ in the solution to $Fe^{2+}$. Subsequently, the solution is measured by the same analysis method used to quantitatively determine $Fe^{2+}$ to obtain the titer of the total Fe.

(3) Calculation of Average Valence of Fe

The description (1) provides the quantitative determination of $Fe^{2+}$, and therefore ((2) titer−(1) titer) represents the quantity of $Fe^{3+}$. The following formula determines the average valence number of Fe.

The average valence of Fe=$\{3\times((2)\text{ titer}-(1)\text{ titer})+2\times(1)\text{ titer}\}/(2)\text{ titer}$ In addition to the aforementioned method, some different oxidation reduction titration methods are applicable to quantify the valence of the iron element; however, the aforementioned method is regarded as superior to others because the reaction required for analysis is simple, the results can be read easily, even general reagents and analysis devices can achieve sufficient accuracy, and skilled analyzers are not needed.

Based on the electroneutrality principle, the relationship, Mn valence (+2 valence)×x+average valence of Fe×(3−x)=oxygen valence (−2 valence)×(4+y), is established in a structural formula. From the above formula, the value y is determined.

An analysis method on Mn, Ca and Sr of the carrier core particles according to the present invention will be described.

(Analysis of Mn)

The Mn content in the carrier core particles was quantitatively analyzed in conformity with a ferromanganese analysis method (potential difference titration) shown in JIS G1311-1987. The Mn content of the carrier core particles of the present invention is a quantity of Mn that was quantitatively analyzed through the ferromanganese analysis method (potential difference titration).

(Analysis of Ca and Sr)

The Ca and Sr contents in the carrier core particles were analyzed by the following method. The carrier core particles of the invention were dissolved in an acid solution and quantitatively analyzed with ICP. The contents of Ca and Sr in the carrier core particles described in this invention are quantities of Ca and Sr that were quantitatively analyzed with the ICP.

The heating process can be performed in an atmosphere with an oxygen concentration ranging from 100 ppm to 6000 ppm. Firing in the atmosphere defined as above can sufficiently promote ferrite reaction, thereby more reliably obtaining the carrier core particles having the aforementioned features.

The molar ratio of strontium to calcium can be set to 0.3 to 3.0. By setting the molar ratio as above, the carrier core particles having the aforementioned features can be more reliably obtained. This molar ratio is expressed as a Sr/Ca molar ratio.

The raw material containing strontium may be $SrCO_3$. The raw material containing calcium may be $CaCO_3$.

Another aspect of the present invention is directed to carrier core particles for electrophotographic developer that include manganese and iron as a core composition and are manufactured by granulating a mixture of a raw material containing manganese, a raw material containing iron, a raw material containing strontium, and a raw material containing calcium, and by firing the obtained granular mixture, the firing step including heating the granular mixture with an increase in temperature to a predetermined degree and cooling the granular mixture in an atmosphere with an oxygen concentration ranging from 5000 ppm to 20000 ppm. The molar ratio of the sum of the strontium and calcium to the sum of the manganese, iron, strontium, and calcium is 0.0026 to 0.013.

Yet another aspect of the invention is directed to carrier core particles for electrophotographic developer that include manganese and iron as a core composition, further include strontium and calcium in the composition, have a roughness Rz of 2.6 μm to 5.2 μm in crystals formed, and have a crystal size variation a of 1.2 to 2.8. The roughness Rz is measured in accordance with JIS B0601:2001. The crystal size variation a is represented by a standard deviation of the widths at the bottom of peaks above the datum plane in a graph of light amounts.

The carrier core particles for electrophotographic developer described above can stably maintain high chargeability over a long time.

When the external magnetic field is 1000 (1 k) Oe (oersted), it is preferable for the carrier core particles for electrophotographic developer to have magnetization of 46 emu/g or higher.

Yet another aspect of the invention is directed to carrier that is used in electrophotographic developer to develop electrophotographic images and includes any of the carrier core particles for electrophotographic developer described above and resin that coats the surface of the carrier core particles for electrophotographic developer.

The carrier for electrophotographic developer that includes the thus-composed carrier core particles for electrophotographic developer can stably maintain high chargeability over a long time.

Still yet another aspect of the present invention is directed to electrophotographic developer that is used to develop electrophotographic images and includes the carrier for electrophotographic developer and toner that can be triboelectrically charged by frictional contact with the carrier for development of electrophotographic images.

The electrophotographic developer including the thus-composed carrier for electrophotographic developer can stably provide good quality images over long-term use.

The method for manufacturing the carrier core particles for electrophotographic developer according to the invention can manufacture carrier core particles for electrophotographic developer capable of stably maintaining high chargeability over a long time.

In addition, the carrier core particles for electrophotographic developer according to the invention can stably maintain high chargeability over a long time.

In addition, the carrier for electrophotographic developer according to the invention can stably maintain high chargeability over a long time.

Furthermore, the electrophotographic developer according to the invention can stably provide good quality images over long-term use.

DETAILED DESCRIPTION OF EMBODIMENTS

Figure 1:
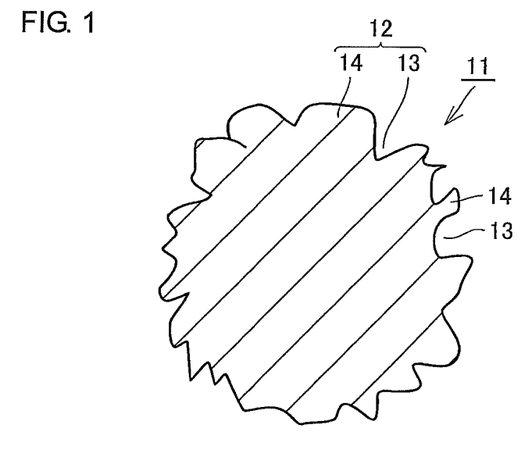
FIG. 1 is a schematic cross-sectional view showing the appearance of a carrier core particle according to an embodiment of the invention.

With reference to the drawings, an embodiment of the present invention will be described below. First, a description about carrier core particles according to the embodiment of the invention will be given. FIG. 1 is a schematic cross-sectional view showing the appearance of a carrier core particle according to the embodiment of the invention.

With reference to FIG. 1, the carrier core particle 11 according to the embodiment of the invention is roughly spherical in shape. The carrier core particles 11 according to the embodiment of the invention have a diameter of approximately 35 μm and an appropriate particle size distribution. The particle diameter refers to volume mean diameter. The particle diameter and particle size distribution are set to any values to meet required characteristics and manufacturing yield of the developer.

On the surface 12 of the carrier core particle 11, there are formed microscopic asperities. Specifically, depressions 13, which are bowed inward, and projections 14, which on the contrary stick out toward the outside diameter, are formed on the surface 12 of the carrier core particle 11. Note that the microscopic asperities are exaggerated in FIG. 1 to provide clear understanding.

Figure 2:
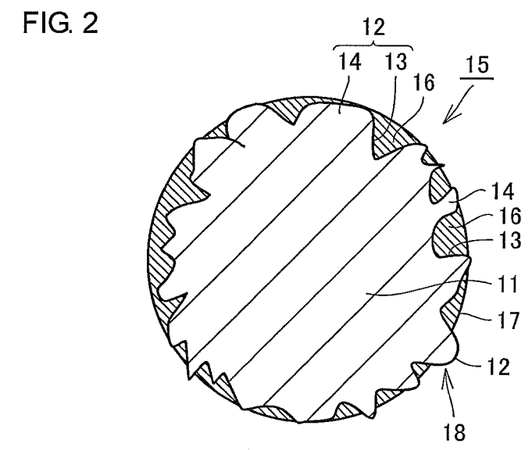
FIG. 2 is a schematic cross-sectional view showing the appearance of a carrier according to the embodiment of the invention.

FIG. 2 is a schematic cross-sectional view showing the appearance of a carrier particle according to the embodiment of the invention. With reference to FIG. 2, the carrier particle 15 according to the embodiment of the invention is roughly spherical in shape as with the case of the carrier core particle 11. The carrier particle 15 is made by coating or covering the carrier core particle 11 with a light coating of resin 16 and has almost the same diameter as the carrier core particle 11. As distinct from the carrier core particle 11, the surface 17 of the carrier particle 15 is covered with the resin 16 in most areas, but the surface 12 of the carrier core particle 11 sticks out of the resin 16 in some areas 18.

Developer according to the embodiment of the invention is composed of the aforementioned carrier 15 shown in FIG. 2 and toner (not shown).

Toner particles are also roughly spherical in shape. The toner particles contain mainly styrene acrylic-based resin or polyester-based resin and a predetermined amount of pigment, wax and other ingredients combined therewith. Such toner particles are manufactured by, for example, a pulverizing method or polymerizing method. The toner particles in use are, for example, approximately 5 μm in diameter, which is about one-seventh of the diameter of the carrier particles 15. The compounding ratio of the toner and carrier 15 is also set to any value according to the required developer characteristics. Such developer is manufactured by mixing a predetermined amount of the carrier 15 and toner by a suitable mixer.

Figure 3:
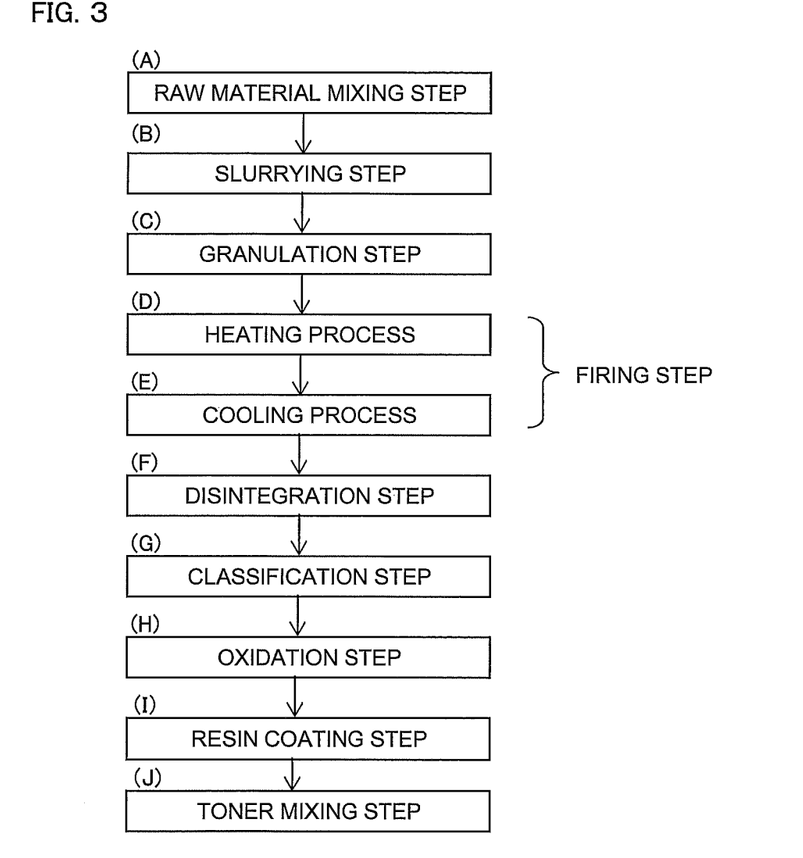
FIG. 3 is a flow chart showing the main steps of a method for manufacturing the carrier core particles according to the embodiment of the invention.

Next, a method for manufacturing the carrier core particles according to the embodiment of the invention will be described. FIG. 3 is a flow chart showing the main steps of the method for manufacturing the carrier core particles according to the embodiment of the invention. Along FIG. 3, the method for manufacturing the carrier core particles according to the embodiment of the invention will be described below.

First, a raw material containing iron, a raw material containing manganese, a raw material containing strontium, and a raw material containing calcium are prepared. The prepared raw materials are formulated at an appropriate compounding ratio to meet the required characteristics, and then mixed (FIG. 3 (A)). The appropriate compounding ratio in this embodiment is set so that the resultant carrier core particles contain target amounts of iron and manganese and therefore have a molar ratio of the sum of the strontium and calcium to the entire metal elements (Mn, Fe, Sr, Ca), which is the sum of the manganese, iron, strontium, and calcium, of 0.0026 to 0.013.

The iron-containing raw material making up the carrier core particles according to the embodiment of the invention can be metallic iron or an oxide thereof, and more specifically, preferred materials include $Fe_2O_3$, $Fe_3O_4$ and Fe, which can stably exist at room temperature and atmospheric pressure. The manganese-containing raw material can be manganese metal or an oxide thereof, and more specifically, preferred materials include Mn metal, $MnO_2$, $Mn_2O_3$, $Mn_3O_4$ and $MnCO_3$, which can stably exist at room temperature and atmospheric pressure. The strontium-containing raw material can be preferably strontium metal or an oxide thereof and more specifically can be $SrCO_3$, which is carbonate, for example. The calcium-containing raw material can be calcium metal or an oxide thereof and more specifically can be, for example, $CaCO_3$, which is carbonate, $Ca(OH)_2$, which is a hydroxide, or CaO, which is an oxide. The raw materials (iron raw material, manganese raw material, strontium raw material, calcium raw material, etc.) can be calcined and pulverized individually or all together after being mixed so as to have the target composition.

Then, the mixed materials are slurried (FIG. 3(B)). Specifically, the materials are weighed out to meet the target composition of the carrier core particles and are mixed to obtain a slurried material.

In a manufacturing step of the method for manufacturing the carrier core particles according to the invention, a reduction agent may be further added to the aforementioned slurried material to accelerate a reduction reaction to be induced in a part of a firing step, which will be described later. A preferred reducing agent may be carbon powder, polycarboxylic acid-based organic substance, polyacrylic acid-based organic substance, maleic acid, acetic acid, polyvinyl alcohol (PVA)-based organic substance, or mixtures thereof.

Water is added to the slurried material that is then mixed and agitated so as to adjust the solid concentration to 40% by weight or higher, preferably 50% by weight or higher. The slurried material containing 50% by weight or higher solid is preferable because such a material can maintain strength when it is granulated into pellets.

Subsequently, the slurried material is granulated (FIG. 3(C)). Granulation of the slurry, which was obtained by mixing and agitation, is performed with a spray drier. Note that it may be preferable to subject the slurry to wet pulverization before the granulation step.

The temperature of an atmosphere during spray drying can be set to approximately 100° C. to 300° C. This can provide granulated powder whose particles are approximately 10 to 200 μm in diameter. In consideration of the final diameter of the particles as a product, it is preferable to filter the obtained granulated powder by a vibrating sieve or the like to remove coarse particles and fine powder for particle size adjustment at this point in time.

Subsequently, the granular material is fired. The firing step includes a heating process (FIG. 3(D)) of heating the granular material with an increase in temperature to a predetermined degree and a cooling process (FIG. 3(E)) of cooling the granular material, after the heating process, in an atmosphere with an oxygen concentration ranging from 5000 ppm to 20000 ppm.

Figure 4:
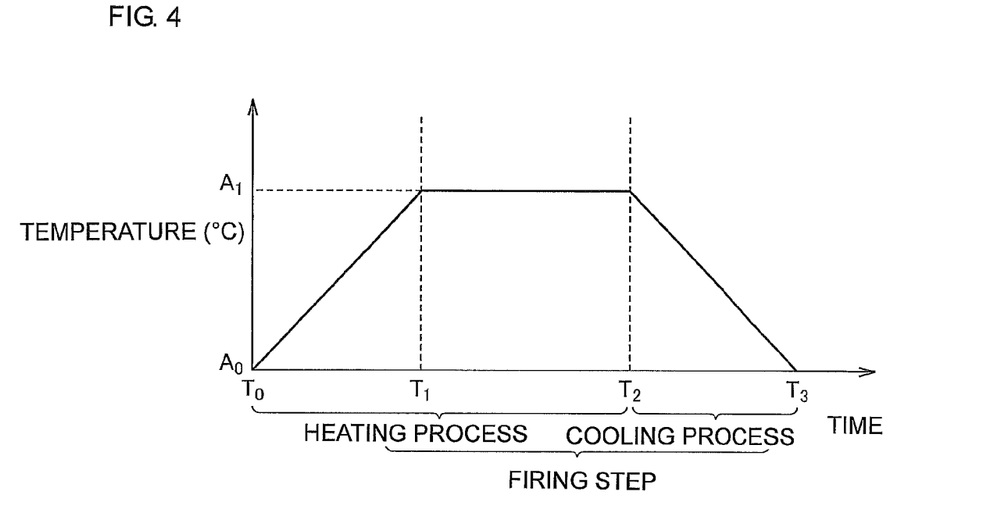
FIG. 4 is a graph briefly showing the relationship between temperature and time in a firing step.

FIG. 4 is a graph briefly showing the relationship between temperature and time in the firing step. In FIG. 4, the vertical axis represents temperature, while the horizontal axis represents time. Referring to FIG. 4, temperature starts rising from room temperature $A_0$, for example, approximately 25° C. at time $T_0$. After reaching predetermined firing temperature $A_1$ at time $T_1$, temperature $A_1$ is maintained from time $T_1$ to time $T_2$. Then, temperature is decreased from temperature $A_1$ to room temperature $A_0$ from time $T_2$ to time $T_3$.

Specifically, the granulated powder obtained is loaded in a furnace heated at approximately 900° C. to 1500° C. and held for 1 to 24 hours in the heating process. At this point, the oxygen concentration in the firing furnace can be set to any values, but should be enough to advance ferritization reaction. If the temperature of the furnace is 1200° C., a gas is introduced and flows in the furnace to adjust the oxygen concentration to $10^{-7}$% to 3%. In this case, a more preferable oxygen concentration is set to 100 ppm to 6000 ppm. If the oxygen concentration in the heating process is set to be lower than 100 ppm, $Fe_2O_3$ is partially reduced and readily produces different phases, such as $Fe_3O_4$, FeO, and Fe. As a result, the magnetic characteristics and electrical characteristics of the obtained carrier core particles are apt to be unsatisfactory. In addition, the oxygen concentration below 100 ppm is not very preferable, because it promotes sintering reaction between particles, which tends to relatively increase the number of odd-shaped particles and fractured or chipped particles. On the other hand, the oxygen concentration over 6000 ppm during the heating process tends to bring relatively insufficient ferritization reaction that may leave some unreacted substances, like $Fe_2O_3$, $Mn_3O_4$, and MnO. Consequently, the resultant carrier core particles are liable to have unsatisfactory magnetic characteristics.

In addition, the reduction atmosphere required for ferritization can be controlled by adjusting the amount of the aforementioned reducing agent. To achieve reaction speed ensuring sufficient productivity in industrialization, the preferable temperature is 900° C. or higher. On the other hand, a firing temperature of 1500° C. or lower does not cause excessive sintering between particles, and therefore the fired material remains in the form of powder.

In the cooling process, the oxygen concentration is set within a predetermined range. Specifically, in the firing step, the fired material is cooled down to approximately room temperature in an atmosphere with a predetermined oxygen concentration, concretely, with an oxygen concentration ranging from 5000 ppm to 20000 ppm. If the oxygen concentration in the cooling process is higher than 20000 ppm, the obtained carrier core particles tend to have low magnetization, resulting in carrier scattering or other phenomena that adversely affect the image quality. On the other hand, if the oxygen concentration in the cooling process is lower than 5000 ppm, the obtained carrier core particles have low electric resistance that may possibly cause electrical breakdown or the like.

It is preferable at this stage to control the particle size of the fired material. For example, the fired material is coarsely ground by a hammer mill or the like. In other words, the fired granules are disintegrated (FIG. 3(F)). After disintegration, classification is carried out with a vibrating sieve or the like. In other words, the disintegrated granules are classified (FIG. 3(G)). Through these steps, carrier core particles having a desired size can be obtained.

Then, the classified granules undergo oxidation (FIG. 3(H)). The surfaces of the carrier core particles obtained at this stage are heat-treated (oxidized). Then, the particle's breakdown voltage is increased to 250 V or higher, thereby imparting appropriate electric resistance of $1\times10^6$ to $1\times10^{13}$ Ω·cm to the carrier core particles. Increasing the electric resistance of the carrier core particles through oxidation results in reduction of carrier scattering caused by charge leakage.

More specifically, the granules are placed in an atmosphere with an oxygen concentration of 10% to 100%, at a temperature of 200° C. to 700° C., for 0.1 to 24 hours to obtain the target carrier core particles. More preferably, the granules are placed at a temperature of 250° C. to 600° C. for 0.5 to 20 hours, further more preferably, at a temperature of 300° C. to 550° C. for 1 to 12 hours. Thus, the carrier core particles according to the embodiment of the invention are manufactured. Note that the oxidation step is optionally executed when necessary.

Thus, the carrier core particles according to the embodiment of the invention are manufactured. The method for manufacturing carrier core particles according to the embodiment of the present invention is a method for manufacturing carrier core particles that contain manganese and iron as a core composition and includes a granulation step of granulating a mixture of a raw material containing manganese, a raw material containing iron, a raw material containing strontium, and a raw material containing calcium, and a firing step of firing the granular mixture granulated in the granulation step. The firing step includes a heating process of heating the granular mixture with an increase in temperature to a predetermined degree and a cooling process of cooling the granular mixture in an atmosphere with an oxygen concentration ranging from 5000 ppm to 20000 ppm. The molar ratio of the sum of strontium and calcium to the sum of manganese, iron, strontium, and calcium is 0.0026 to 0.013.

The method for manufacturing the carrier core particles can provide carrier core particles with appropriate asperities formed thereon to maintain excellent electrical characteristics over a long time while ensuring high mechanical strength and excellent magnetic characteristics.

The carrier core particles according to the embodiment of the invention are carrier core particles containing manganese and iron as a core composition and are manufactured by granulating a mixture of a raw material containing manganese, a raw material containing iron, a raw material containing strontium, and a raw material containing calcium, and firing the granular mixture, the firing step including heating the granular mixture with an increase in temperature to a predetermined degree and cooling the granular mixture, after the heating process, in an atmosphere with an oxygen concentration ranging from 5000 ppm to 20000 ppm. The molar ratio of the sum of strontium and calcium to the sum of manganese, iron, strontium, and calcium is 0.0026 to 0.013.

The carrier core particles described above can stably maintain high chargeability over a long time.

If the molar ratio of the sum of strontium and calcium to the sum of manganese, iron, strontium, and calcium is lower than 0.0026, the following phenomena are assumed to predominantly occur. Specifically, if the molar ratio of the sum of strontium and calcium to the sum of manganese, iron, strontium, and calcium is lower than 0.0026, the resultant carrier core particles have strontium ferrite present at a small ratio and less segregation of calcium oxide at grain boundaries, thereby making it difficult to grow the crystals along the outside diameter. Consequently, the overall physical properties of the resultant carrier core particles may be unfavorable because the roughness Rz of the particle surface becomes small and variations in crystal size become wide. On the other hand, if the molar ratio of the sum of strontium and calcium to the sum of manganese, iron, strontium, and calcium is higher than 0.013, the following phenomena are assumed to predominantly occur. Specifically, if the molar ratio of the sum of strontium and calcium to the sum of manganese, iron, strontium, and calcium is higher than 0.013, the resultant carrier core particles have strontium ferrite present at a large ratio and more segregation of calcium oxide at grain boundaries, thereby making it easy to grow the crystals along the outside diameter. Consequently, the resultant carrier core particles have asperities on the surface at a high degree of roughness Rz and relatively small variations in crystal size. However, it is difficult to satisfy the requirement on magnetization of the carrier core particles, and as a result, carrier scattering or other problems may occur. In this case, the overall physical properties of the resultant carrier core particles may be unfavorable because the sintering property is deteriorated that entails reduction in strength required to the carrier core particles.

Next, the carrier core particles obtained as described above are coated with resin (FIG. 3(I)). Specifically, the carrier core particles obtained according to the invention are coated with silicone-based resin, acrylic resin or the like. Finally, carrier for electrophotographic developer according to the embodiment of the invention is achieved. The silicone-based resin, acrylic resin or other coating materials can be applied through a well-known coating method. Specifically speaking, the carrier for electrophotographic developer according to the embodiment of the invention is carrier that is contained in developer to develop electrophotographic images and includes the above-described carrier core particles for electrophotographic developer and resin that coats the surface of the carrier core particles for electrophotographic developer.

The carrier for electrophotographic developer that includes the aforementioned carrier core particles for electrophotographic developer can stably maintain high chargeability over a long time.

Next, predetermined amounts of the carrier and toner are mixed (FIG. 3(J)). Specifically, the carrier, which is obtained through the above-described manufacturing method, for electrophotographic developer according to the embodiment of the invention is mixed with an appropriate well-known toner. In this manner, the electrophotographic developer according to the embodiment of the invention can be achieved. The carrier and toner are mixed by any type of mixer, for example, a ball mill. The electrophotographic developer according to the embodiment of the invention is developer that is used to develop electrophotographic images and includes the above-described carrier for electrophotographic developer and toner that can be triboelectrically charged by frictional contact with the carrier for development of electrophotographic images.

The electrophotographic developer including the thus-composed carrier for electrophotographic developer can stably provide good quality images over long-term use.

EXAMPLES

Example 1

9.2 g of $SrCO_3$ as a raw material containing strontium and 18.8 g of $CaCO_3$ as a raw material containing calcium were added to a mixture of 5.38 kg of $Fe_2O_3$ (average diameter: 0.6 µm) and 2.12 kg of $Mn_3O_4$ (average diameter: 2 µm) to obtain a mixture. The mixture was heated at 800° C. to 1100° C. for 1 to 10 hours to obtain calcined powder. This calcined powder was dispersed in 2.5 kg of water. 45.0 g of ammonium polycarboxylate-based dispersant and 22.5 g of carbon black reducing agent (abbreviated as CB in Table 1) were added to the water with the calcined powder dispersed, and the mixture was pulverized by a wet ball mill (media diameter 2 mm) to obtain mixture slurry.

The slurry was sprayed into hot air of approximately 130° C. by a spray dryer and turned into dried granulated powder. At this stage, granulated powder particles out of the target particle size distribution were removed by a sieve. The remaining granulated powder was placed in an electric furnace and fired at 1130° C. for 3 hours. In this firing step, the granulated powder was heated in an atmosphere with an oxygen concentration of 5000 ppm by an electric furnace in which the oxygen concentration is controllable from 100 ppm to 6000 ppm, and then the granulated powder was cooled in an atmosphere with an oxygen concentration of 15000 ppm by the electric furnace in which the oxygen concentration is controllable from 5000 ppm to 20000 ppm. The fired powder was disintegrated and then classified by a sieve to obtain carrier core particles having an average particle diameter of 35 µm. In addition, the obtained carrier core particles were maintained at 470° C. under atmosphere for 1 hour to be oxidized, thereby achieving carrier core particles according to Example 1. The composition, physical properties, magnetic characteristics, electrical characteristics, mechanical characteristics, and evaluations using a real machine of the carrier core particles are shown in Tables 1, 2, 3, and 4. The composition of the carrier core particles mainly shown in Table 2 is obtained by measuring the resultant carrier core particles by the analysis method described above.

Amounts of Sr and Ca added (represented as "SrCa addition amount" in the Table 2 and the following expression) are determined by the following equation.

SrCa addition amount (wt %)=($SrCO_3$ (g)+$CaCO_3$ (g))/($Fe_2O_3$ (g)+$Mn_3O_4$ (g))×100

The obtained carrier core particles contained manganese at a composition ratio, expressed by "x", of 0.88 and contained iron at a composition ratio, expressed by "3-x", of 2.12. In Examples 2 to 14, Comparative examples 1 to 8 shown below, the values of x and 3-x are all the same as those of Example 1.

In addition, crystal phases obtained include, for example, $MnFe_2O_4$, and $SrO\cdot6Fe_2O_3$. In the following Examples 2 to 14 and Comparative examples 1 to 7, the same phases are obtained. In Comparative example 8, $Fe_2O_3$ is formed in addition to the $MnFe_2O_4$ and $SrO\cdot6Fe_2O_3$.

Example 2

The carrier core particles of Example 2 were obtained in the same manner as Example 1; however, 18.5 g of $SrCO_3$ and 37.5 g of $CaCO_3$ were added.

Example 3

The carrier core particles of Example 3 were obtained in the same manner as Example 1; however, 37.0 g of $SrCO_3$ and 75.0 g of $CaCO_3$ were added.

Example 4

The carrier core particles of Example 4 were obtained in the same manner as Example 1; however, 46.1 g of $SrCO_3$ and 93.8 g of $CaCO_3$ were added.

Example 5

The carrier core particles of Example 5 were obtained in the same manner as Example 1; however, 18.5 g of $SrCO_3$ and 12.5 g of $CaCO_3$ were added.

Example 6

The carrier core particles of Example 6 were obtained in the same manner as Example 1; however, 36.9 g of $SrCO_3$ and 25.0 g of $CaCO_3$ were added.

Example 7

The carrier core particles of Example 7 were obtained in the same manner as Example 1; however, 73.8 g of $SrCO_3$ and 50.0 g of $CaCO_3$ were added.

Example 8

The carrier core particles of Example 8 were obtained in the same manner as Example 1; however, 92.3 g of $SrCO_3$ and 62.5 g of $CaCO_3$ were added.

Example 9

The carrier core particles of Example 9 were obtained in the same manner as Example 1; however, 27.7 g of $SrCO_3$ and 6.3 g of $CaCO_3$ were added.

Example 10

The carrier core particles of Example 10 were obtained in the same manner as Example 1; however, 55.4 g of $SrCO_3$ and 12.5 g of $CaCO_3$ were added.

Example 11

The carrier core particles of Example 11 were obtained in the same manner as Example 1; however, 110.7 g of $SrCO_3$ and 25.0 g of $CaCO_3$ were added.

Example 12

The carrier core particles of Example 12 were obtained in the same manner as Example 1; however, 138.4 g of $SrCO_3$ and 31.3 g of $CaCO_3$ were added.

Example 13

The carrier core particles of Example 13 were obtained in the same manner as Example 1; however, the oxygen concentration in the cooling process was set to 6000 ppm.

Example 14

The carrier core particles of Example 14 were obtained in the same manner as Example 1; however, the oxygen concentration in the cooling process was set to 20000 ppm.

Comparative Example 1

The carrier core particles of Comparative example 1 were obtained in the same manner as Example 1; however, 10.75 kg of $Fe_2O_3$, 4.25 kg of $Mn_3O_4$, 22.1 g of $SrCO_3$, 45.0 g of CB, and 90.0 g of dispersant were added to 5.0 kg of water, but $CaCO_3$ was not added.

Comparative Example 2

The carrier core particles of Comparative example 2 were obtained in the same manner as Example 1; however, 147.6 g of $SrCO_3$ was added, but $CaCO_3$ was not added.

Comparative Example 3

The carrier core particles of Comparative example 3 were obtained in the same manner as Example 1; however, 55.4 g of $SrCO_3$ and 112.5 g of $CaCO_3$ were added.

Comparative Example 4

The carrier core particles of Comparative example 4 were obtained in the same manner as Example 1; however, 110.7 g of $SrCO_3$ and 75.0 g of $CaCO_3$ were added.

Comparative Example 5

The carrier core particles of Comparative example 5 were obtained in the same manner as Example 1; however, 166.1 g of $SrCO_3$ and 37.5 g of $CaCO_3$ were added.

Comparative Example 6

The carrier core particles of Comparative example 6 were obtained in the same manner as Comparative example 2; however, $SrCO_3$ was not added, but 18.8 g of $CaCO_3$ was added.

Comparative Example 7

The carrier core particles of Comparative example 7 were obtained in the same manner as Example 1; however, the oxygen concentration in the cooling process was set to 4000 ppm.

Comparative Example 8

The carrier core particles of Comparative example 8 were obtained in the same manner as Example 1; however, the oxygen concentration in the cooling process was set to 25000 ppm.

[Table 1]
[Table 2]
[Table 3]
[Table 4]

⊚: The test image was reproduced very well.
○: The test image was mostly reproduced.
Δ: The test image was not mostly reproduced.
x: The test image was not at all reproduced.

Note that the molar ratios of Sr/Ca, or strontium to calcium, of Examples 1 to 4, 13 and 14 and Comparative examples 3, 7 and 8 were 0.3; the molar ratios of strontium to calcium of Examples 5 to 8 and Comparative example 4 were 1.0; and the molar ratios of strontium to calcium of Examples 9 to 12 and Comparative example 5 were 3.0. In addition, the carrier core particles of Comparative examples 1 and 2 contain a predetermined amount of strontium, but not calcium, whereas the carrier core particles of Comparative example 6 contain a predetermined amount of calcium, but not strontium.

A specific calculation method of the molar ratios in Table 2 is shown below. First, the atomic weights of elements, Sr, Ca, Mn and, Fe, are defined as 87.6, 40.1, 54.9, and 55.8, respectively. The molar ratio of metal elements to Sr contained in the carrier core particles is determined by the equation: molar ratio={(weight percentage of metal element content)/(atomic weight of metal element content)}/{(weight percentage of Sr content)/(atomic weight of Sr content)}.

To measure magnetic characteristics shown in Table 3, magnetization was measured with a VSM (Model VSM-P7 produced by Toei Industry Co., Ltd.). The item "σ1k" in Table 3 indicates magnetization in an external magnetic field of 1000 (1 k) Oe (oersted).

The BET specific surface area was evaluated by using a single-point BET surface area analyzer (Model: Macsorb HM model-1208 produced by Mountech CO., Ltd.). Specifically, samples, each of which weighed in at 8.500 g, were loaded to a 5-ml (cc) cell that was then degassed at 200° C. for 30 minutes to measure the BET specific surface area thereof.

The item "AD" denotes apparent density (g/ml). The apparent density was measured per JIS Z2504 (2000).

The roughness Rz and variations σ in crystal size were measured as follows. An evaluation machine used herein was Model VK-210 and VK-X200 produced by Keyence Corporation. The crystal size variation σ is measured by using an "automated measurement" function in analysis software (analysis application VK-H1XA) supplied with the measurement device VK-210, VK-X200.

First, a piece of carbon tape was affixed onto a microscope slide and a sample was secured on the carbon tape. A 25-μm scale bar was displayed on a microscope to look for a field of view in which a few particles of around 25 μm were captured at 3000-fold magnification. Then, brightness was automatically adjusted to capture an image. Both the captured image and profile data were checked and a horizontal profile line was manually drawn to estimate the diameter of the particles for analysis of particles of around 25 μm.

(Roughness Rz)

As preprocessing on the image, peak noise was removed (cutoff level: normal). Subsequently, an area of 20 square micrometers with the center at a top of a particle to be analyzed was defined and was subjected to curvature corrections (tilt correction, spherical surface correction (auto)). Then, an area of 10 μm in diameter (inside of the incircle) around the center of the top of the particle to be analyzed (particle's top) was defined as a measurement area that was then subjected to cutoff processing (λs: 0.25 μm, λc: 0.08 mm). The data was output to obtain the Rz value of each particle to evaluate it as the roughness of the particle. In order to examine measurement variations of particles, 100 particles were evaluated and the average value thereof was listed as the roughness Rz in Table 3.

(Variation σ in Crystal Size)

As preprocessing on the image, peak noise was removed (cutoff level: normal). Subsequently, an area of 20 square micrometers with the center at a top of a particle to be analyzed was defined and was subjected to curvature corrections (tilt correction, spherical surface correction (auto)).

(1) An area (of 10 square micrometers around a particle's top) around the center of the top of the particle to be analyzed is defined as a measurement area and ten measurement lines of 10 μm in length were set in the measurement area.

(2) Along the ten measurement lines, line-scanning was performed to obtain their light amounts (cutoff ($\lambda$s: 0.25 μm, $\lambda$c: 0.08 mm)).

(3) The following measurement items were calculated for each of the measurement lines.

A: A median value in a range of the light amounts was defined as a datum plane and the bottom (width) of peaks above the datum plane was measured.

B: A standard deviation of the plurality of measured widths was calculated (SD of each line).

(4) The average of the SD values obtained from the respective ten measurement lines was defined as an SD of each particle.

(5) The SD value was obtained for 100 particles, and the average of the 100 SD values was defined as a variation a in crystal size listed in Table 3.

Item "core charge amount" in Table 3 denotes the amount of charge the cores, that is, carrier core particles can hold. Measurement of the core charge amount will be described below. 9.5 g of the carrier core particles and 0.5 g of toner for commercial full-color copying machines were put in a 100-ml glass bottle with a cap and the bottle was placed in an environment at 25° C. and 50 RH % for 12 hours to control the moisture. The moisture-controlled carrier core particles and toner were shaken for 30 minutes by a shaker and mixed. The shaker in use was a model NEW-YS produced by YAYOI CO., LTD. and was operated at a shaking speed of 200/min and at an angle of 60°. From the mixture of the carrier core particles and toner, 500 mg of the mixture was weighed out and measured for the charge amount by a charge measurement apparatus. In this embodiment, the measurement apparatus in use was a model STC-1-C1 produced by JAPAN PIO-TECH CO., LTD. and was operated at a suction pressure of 5.0 kPa with a suction mesh made of SUS and with 795 mesh.

Two samples of the same were measured and the average of the measured values was defined as the core charge amount. The core charge amount was calculated by the following formula: core charge amount (μC (coulomb)/g)=measured charge (nC)×$10^3$×coefficient (1.0083×$10^{-3}$)÷toner weight (weight before suction (g)−weight after suction (g)).

The charge amount of the carrier with coating resin applied thereon was measured in the same manner as the core charge amount. The measurement of the charge amount of the carrier was performed at ambient temperature and humidity, more specifically, at 25° C. and 50 RH %.

The strength was measured as follows. First, 30 g of carrier core particles were loaded into a sample mill. The sample mill in use was Model SK-M10 produced by KYORITSU RIKO KK. Then, the carrier core particles were subjected to a crush test at 14000 rpm for 60 seconds. Subsequently, the cumulative values of crushed carrier core particle debris of 22 μm or lower between before and after the crush test were measured to obtain a rate of change. The change rate was defined as an increase rate of fine powder. The cumulative values were volume measured by a laser diffraction particle size analyzer. The laser diffraction particle size analyzer was Microtrac Model 9320-X100 produced by NIKKISO CO., LTD. The strength (%) measured as above becomes higher as the increase rate becomes lower.

Evaluation using a real machine was conducted as follows. First, silicone resin (SR2411 produced by Dow Corning Toray Co., Ltd.) was dissolved in toluene to prepare a coating resin solution. Then, the carrier core particles and the prepared resin solution in a 9:1 weight ratio were loaded in an agitator that agitated and heated the carrier core particles immersed in the resin solution for 3 hours at a temperature of 150° C. to 250° C.

Thus manufactured resin-coated carrier core particles were placed in a circulating hot air oven and heated at 250° C. for 5 hours to cure the coating resin layer, thereby obtaining carrier for electrophotographic developer according to Example 1.

The carrier particles and toner particles with a diameter of approximately 5 μm were mixed in a pot mill for a predetermined period of time to obtain two-component electrophotographic developer associated with Example 1. With the two-component electrophotographic developer and a digital reversal development-type test machine operable at a copy speed of 60 prints per minute, evaluation of image quality was made at the initial stage, after completion of printing procedure of 100K prints, and after completion of printing procedure of 200K prints. The carrier core particles of Examples 2 to 14 and Comparative Examples 1 to 8 were subjected to the same steps to obtain the carrier and electrophotographic developer associated with the respective examples. Note that "k" represents 1000. For example, "100 k prints" denotes "100000 prints" and "200 k prints" denotes "200000 prints".

The two-component electrophotographic developers were evaluated for image quality on a scale from one to four as follows.

⊚: The test image was reproduced very well.

○: The test image was mostly reproduced.

Δ: The test image was not mostly reproduced.

x: The test image was not at all reproduced.

Referring to Table 1 to Table 4, Examples 1 to 14 exhibit a magnetization of 46.0 emu/g or higher in an external magnetic field of 1000 (1 k) Oe (oersted) and therefore have no problem at the time of actual use.

On the other hand, Comparative examples 4, 5 and 8 have a magnetization of 44.8 emu/g, 43.0 emu/g, and 42.5 emu/g, respectively, and these magnetization values are all 45.0 emu/g or low, which are at a problematic level. In other words, the carrier core particles at that level may be susceptible to scattering and other problems over long-term use.

The BET specific surface areas of Examples 1 to 14 and Comparative examples 1 to 8 fall in a wide range of measurement values from 0.088 $m^2$/g to 0.218 $m^2$/g.

As to AD, Examples 1 to 14 have all 2.09 g/ml or higher and therefore have no problem at the time of actual use.

The shape of asperities on the surface of the carrier core particles will be considered next. The roughness Rz values of Examples 1 to 14 all fall within a range from 2.6 μm to 4.7 μm, and at least in a range from 2.6 μm to 5.2 μm. On the contrary, Comparative example 1 has 1.7 μm, Comparative example 2 has 2.0 μm, Comparative example 3 has 5.3 μm, Comparative example 4 has 5.5 μm, Comparative example 5 has 5.5 μm, Comparative example 6 has 1.1 μm, Comparative example 7 has 1.8 μm, and Comparative example 8 has 2.5 μm. In short, the roughness Rz values of Comparative examples 1 to 8 are 2.5 μm or lower or 5.3 μm or higher. The roughness values mean that the carrier core particles are simply smooth or very rough, both are not preferable.

Variations σ in crystal size of Examples 1 to 14 all fall within a range from 1.2 to 2.8, and at least in a range of 1.2 or higher, but 2.8 or lower. On the contrary, Comparative example 1 has 3.5, Comparative example 2 has 4.2, Comparative example 3 has 1.1, Comparative example 4 has 1.0, Comparative example 5 has 0.9, Comparative example 6 has 4.5, Comparative example 7 has 3.3, and Comparative example 8 has 2.9. In short, the variations of Comparative examples 1 to 8 are 1.1 or lower, or 2.9 or higher. The crystal size variations σ of 2.9 or higher demonstrate that the carrier core particles have crystals with wide variations in size. The wide variations make differences in how the coating resin coats the carrier core particles and also deteriorate the strength of the particles, both are not favorable. On the other hand, the crystal size variations σ of 1.1 or lower demonstrate that the carrier core particles have crystals with small variations in size. The small variations do not easily affect the coating condition of the coating resin; however, such carrier core particles are not preferable, because they have low particle strength and therefore may cause defective images due to chipping or fracturing.

The core charge amounts of Examples 1 to 14 all fall within a range from 16.5 μC/g to 23.2 μC/g, that is, 16.5 μC/g or higher. On the contrary, Comparative example 1 has 16.1 μC/g, Comparative example 2 has 16.4 μC/g, Comparative example 3 has 13.0 μC/g, Comparative example 4 has 11.7 μC/g, Comparative example 5 has 13.2 μC/g, Comparative example 6 has 16.2 μC/g, Comparative example 7 has 13.1 μC/g, and Comparative example 8 has 16.3 μC/g. In short, the core charge amounts of Comparative examples 1 to 8 are 16.4 μC/g or lower, and more particularly, the core charge amounts of Comparative examples 3 to 5, and 7 are 13.5 μC/g or lower. Thus, Examples 1 to 14 demonstrate that the carrier core particles can hold large amounts of charge and have relatively high chargeability even at exposed surface parts thereof.

The values concerning the strength of Examples 1 to 14 all fall within a range from 0.4 to 0.9, or at least 1.0 or lower. On the contrary, Comparative example 1 has 1.1, Comparative example 2 has 1.5, Comparative example 3 has 1.2, Comparative example 4 has 1.5, Comparative example 5 has 1.3, Comparative example 6 has 2.2, Comparative example 7 has 1.5, and Comparative example 8 has 1.3. In short, the values of the strength of Comparative examples 1 to 8 are 1.1 or higher. These values show that the carrier core particles of Examples 1 to 14 have higher strength than those of Comparative examples 1 to 8.

The resin-coated carrier particles of Examples 1 to 14, and Comparative examples 1 to 6, and 8 all can hold charge in an amount ranging from 22 μC/g to 24 μC/g at 0 k prints. Except for Comparative example 7, Examples 1 to 14 and Comparative examples 1 to 8 have no particular problematic differences in charge amount at the initial stage. After 100 k prints, the charge amounts of Examples 1 to 14 still fall within a range from 18 μC/g to 23 μC/g or at least 18 μC/g or higher. These values show that there is not a significant decrease in the amount of charge after 100 k prints. On the contrary, Comparative example 1 has 15 μC/g, Comparative example 2 has 17 μC/g, Comparative example 3 has 10 μC/g, Comparative example 4 has 15 μC/g, Comparative example 5 has 6 μC/g, Comparative example 6 has 13 μC/g, Comparative example 7 has 6 μC/g, and Comparative example 8 has 17 μC/g. In short, the charge amounts of Comparative examples 1 to 8 are 17 μC/g or lower, and those values show that the charge amounts have decreased after 100 k prints. After 200 k prints, the charge amounts of Examples 1 to 14 still fall within a range from 15 μC/g to 21 μC/g, or at least 15 μC/g or higher. These values show that the charge amounts were slightly decreased in comparison with the charge amounts at 100 k prints, but did not significantly drop even after 200 k prints. On the contrary, Comparative example 1 has 3 μC/g, Comparative example 2 has 5 μC/g, Comparative example 3 has 5 μC/g, Comparative example 4 has 9 μC/g, Comparative example 5 has 3 μC/g, Comparative example 6 has 2 μC/g, Comparative example 7 has 2 μC/g, and Comparative example 8 has 10 μC/g. In short, the charge amounts of Comparative examples 1 to 8 are 10 μC/g or lower, and the values show that there is a significant decrease in the amount of charge after 200 k prints.

The following are results of real-machine evaluation with respect to image quality. At 0 k prints, all of Examples 1 to 14 and Comparative examples 1 to 6 reproduce the test image very well (⊚), have no particular differences in image quality, and therefore are at a non-problematic level. Comparative examples 7 to 8 do not reproduce the test image very well even at this initial stage, but mostly reproduce the test image (○). At 100 k prints, Examples 1 to 14 reproduce the test image very well (⊚) or mostly reproduce the test image (○). On the contrary, any of Comparative examples 1 to 8 do not reproduce the test image very well (⊚), but reach a level at which the test image is mostly reproduced (○), the test image is not mostly reproduced (Δ), or the test image is not reproduced at all (x). At 200 k prints, Examples 1 to 14 still reproduce the test image very well (⊚) or mostly reproduce the test image (○). On the contrary, Comparative examples 1 to 8 reach a level at which the test image is not mostly reproduced (Δ) or the test image is not reproduced at all (x). It is considered that the image quality may correlate with the amount of charge, and it is actually demonstrated that image quality is deteriorated with a decrease in the amount of charge. In addition, chipping and fracturing caused by poor strength and carrier scattering caused by lack of magnetization may affect the image quality.

Figure 5:
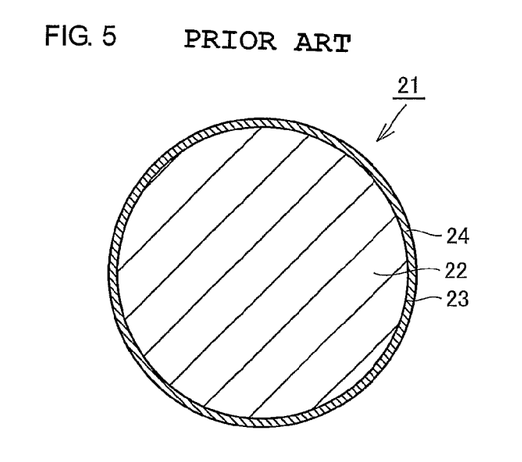
FIG. 5 is a schematic cross-sectional view showing the appearance of a conventional carrier.
Figure 6:
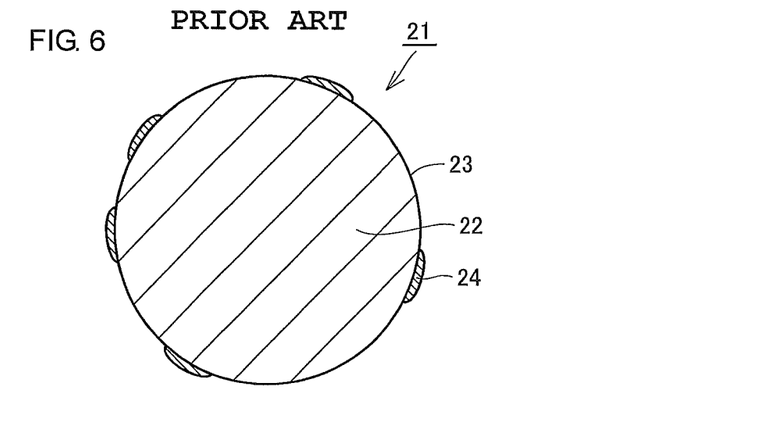
FIG. 6 is a schematic cross-sectional view showing the appearance of the conventional carrier that has been used for a long time.
Figure 7:
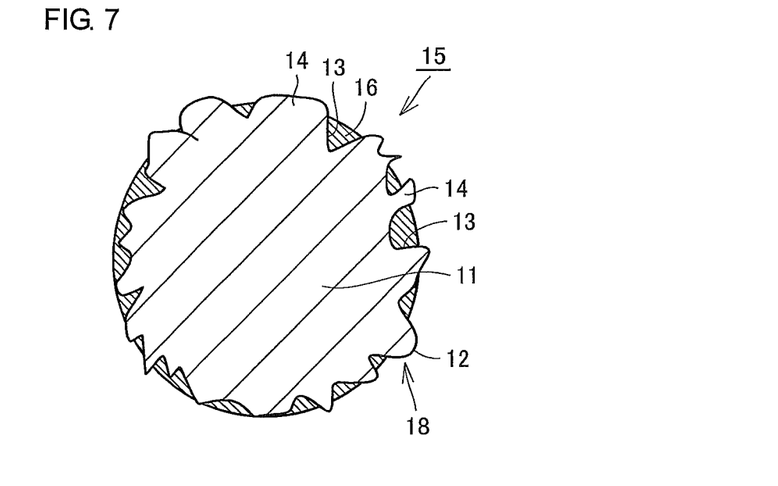
FIG. 7 is a schematic cross-sectional view showing the appearance of a carrier that has been used for a long time, according to the embodiment of the invention.

The decrease in the amount of charge during the printing durability test may be caused by the following phenomenon. FIG. 5 is a schematic cross-sectional view showing the appearance of a conventional carrier particle. FIG. 6 is a schematic cross-sectional view showing the appearance of the conventional carrier particle that has been used for a long time. FIG. 7 is a schematic cross-sectional view showing the appearance of a carrier particle according to the embodiment of the invention. The carrier particle shown in FIG. 5 is a conventional carrier particle and especially a carrier particle that has not been used for image formation, which corresponds to the carrier particle shown in FIG. 2. FIGS. 6 and 7 show carrier particles that have been used to output, for example, 200 k prints. The conventional carrier particle described herein has a small degree of asperities on the surface, in other words, has a smooth surface as represented by, for example, Comparative examples 1, 2, and 6.

Referring to FIG. 5, the conventional carrier particle 21 includes a carrier core particle 22 with a surface 23 having some asperities, but being relatively smooth. Resin 24 is applied so as to cover almost the entire smooth surface 23. Since almost the entire surface 23 is covered with the resin 24, the carrier particle 21 before being used, or at the initial stage, exhibits a relatively large amount of charge. With the use of the carrier particles 21, the resin 24 falls off. After 200 k prints, most parts of the resin 24 fall off during agitation or other processing in the developing apparatus, as shown in FIG. 6, due to the smoothness of the surface 23 of the carrier core particle 22, resulting in almost no areas with the resin 24 remaining. Consequently, the carrier particle 21 has lost most of the resin 24, which is indispensable to increase the amount of charge, and has many areas to which the surface 23 of the carrier core particle 22 is exposed. If the carrier core particle 22 is low in hardness, fracturing and chipping in the carrier core particle 22 further increase the ratio of areas uncoated with the resin 24. As a result, the amount of charge of the carrier particle 21 becomes low. Also, the difference in amount of the coating resin becomes significant between the initial stage and after long-term use.

On the other hand, referring to FIG. 7, the carrier particle 15 according to the embodiment of the invention has appropriate asperities on the surface and therefore the resin 16, especially filled in depressions 13, remains even after long-term use. Of course, the resin 16 that coats projections 14 may fall off during agitation in the developing apparatus and therefore the amount of resin 16 as a whole may be decreased; however, the amount of the lost resin is relatively small and actually many of the depressions 13 keep holding the resin 16. Also, the change in amount of the coating resin becomes small between the initial stage and after long-term use. Therefore, with the high mechanical strength and the high core charge amount, the carrier can maintain the high charge amount over a long time. The high charge amount of the carrier according to the embodiment is probably achieved by the above-described phenomenon.

However, the carrier core particles with an excessively large degree of roughness Rz, as shown in Comparative examples 3, 4, and 5, may have, for example, poor flowability that produces unduly large stress during mixture and agitation in the developing apparatus, resulting in further fracturing and chipping in the carrier core particles. In addition, there may be a possibility that the resin may not appropriately flow into the depressions in the surface of the carrier core particles at a step of resin-coating.

The carrier core particles for electrophotographic developer according to the present invention are carrier core particles for electrophotographic developer containing manganese and iron as a core composition, further including strontium and calcium in the core composition, having a roughness Rz of the formed crystals of 2.6 μm to 5.2 μm, and having a crystal size variation σ of 1.2 to 2.8. The carrier core particles described above can stably maintain high chargeability over a long time.

As to the oxygen amount y in the aforementioned embodiment, the oxygen concentration in the heating process of the firing step is set higher than a predetermined concentration in order to have the carrier core particles contain an excess amount of oxygen; however, the present invention is not limited thereto, and, for example, adjustment of compounding ratio made in the raw material mixing step also allows the carrier core particles to contain an excess amount of oxygen.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

The method for manufacturing carrier core particles for electrophotographic developer, the carrier core particles for electrophotographic developer, the carrier for electrophotographic developer and the electrophotographic developer according to the present invention can be effectively used when applied to copying machines or the like that are required to stably maintain good image quality for a long time.

TABLE 1

|  | $Fe_2O_3$ (kg) | $Mn_3O_4$ (kg) | $SrCO_3$ (g) | $CaCO_3$ (g) | CB (g) | Dispersant (g) | Water (kg) | Heating Atmosphere (ppm) | Cooling Atmosphere (ppm) |
|---|---|---|---|---|---|---|---|---|---|
| EXAMPLE 1 | 5.38 | 2.12 | 9.2 | 18.8 | 22.5 | 45.0 | 2.5 | 5000 | 15000 |
| EXAMPLE 2 | 5.38 | 2.12 | 18.5 | 37.5 | 22.5 | 45.0 | 2.5 | 5000 | 15000 |
| EXAMPLE 3 | 5.38 | 2.12 | 37.0 | 75.0 | 22.5 | 45.0 | 2.5 | 5000 | 15000 |
| EXAMPLE 4 | 5.38 | 2.12 | 46.1 | 93.8 | 22.5 | 45.0 | 2.5 | 5000 | 15000 |
| EXAMPLE 5 | 5.38 | 2.12 | 18.5 | 12.5 | 22.5 | 45.0 | 2.5 | 5000 | 15000 |
| EXAMPLE 6 | 5.38 | 2.12 | 36.9 | 25.0 | 22.5 | 45.0 | 2.5 | 5000 | 15000 |
| EXAMPLE 7 | 5.38 | 2.12 | 73.8 | 50.0 | 22.5 | 45.0 | 2.5 | 5000 | 15000 |
| EXAMPLE 8 | 5.38 | 2.12 | 92.3 | 62.5 | 22.5 | 45.0 | 2.5 | 5000 | 15000 |
| EXAMPLE 9 | 5.38 | 2.12 | 27.7 | 6.3 | 22.5 | 45.0 | 2.5 | 5000 | 15000 |
| EXAMPLE 10 | 5.38 | 2.12 | 55.4 | 12.5 | 22.5 | 45.0 | 2.5 | 5000 | 15000 |
| EXAMPLE 11 | 5.38 | 2.12 | 110.7 | 25.0 | 22.5 | 45.0 | 2.5 | 5000 | 15000 |
| EXAMPLE 12 | 5.38 | 2.12 | 138.4 | 31.3 | 22.5 | 45.0 | 2.5 | 5000 | 15000 |
| EXAMPLE 13 | 5.38 | 2.12 | 9.2 | 18.8 | 22.5 | 45.0 | 2.5 | 5000 | 6000 |
| EXAMPLE 14 | 5.38 | 2.12 | 9.2 | 18.8 | 22.5 | 45.0 | 2.5 | 5000 | 20000 |
| COMPARATIVE EXAMPLE 1 | 10.75 | 4.25 | 22.1 | 0.0 | 45.0 | 90.0 | 5.0 | 5000 | 15000 |
| COMPARATIVE EXAMPLE 2 | 5.38 | 2.12 | 147.6 | 0.0 | 22.5 | 45.0 | 2.5 | 5000 | 15000 |
| COMPARATIVE EXAMPLE 3 | 5.38 | 2.12 | 55.4 | 112.5 | 22.5 | 45.0 | 2.5 | 5000 | 15000 |
| COMPARATIVE EXAMPLE 4 | 5.38 | 2.12 | 110.7 | 75.0 | 22.5 | 45.0 | 2.5 | 5000 | 15000 |
| COMPARATIVE EXAMPLE 5 | 5.38 | 2.12 | 166.1 | 37.5 | 22.5 | 45.0 | 2.5 | 5000 | 15000 |
| COMPARATIVE EXAMPLE 6 | 5.38 | 2.12 | 0.0 | 18.8 | 22.5 | 45.0 | 2.5 | 5000 | 15000 |
| COMPARATIVE EXAMPLE 7 | 5.38 | 2.12 | 9.2 | 18.8 | 22.5 | 45.0 | 2.5 | 5000 | 4000 |
| COMPARATIVE EXAMPLE 8 | 5.38 | 2.12 | 9.2 | 18.8 | 22.5 | 45.0 | 2.5 | 5000 | 25000 |

TABLE 2

|  | Fe (mol) | Mn (mol) | Sr (mol) | Ca (mol) | Sum of metals (mol) | Sr + Ca/ Sum of metals (Molar ratio) | Sr/Ca (Molar ratio) | SrCa addition amount (wt %) |
|---|---|---|---|---|---|---|---|---|
| EXAMPLE 1 | 0.0673 | 0.0278 | 0.0001 | 0.0002 | 0.0954 | 0.0026 | 0.3 | 0.4 |
| EXAMPLE 2 | 0.0673 | 0.0278 | 0.0001 | 0.0004 | 0.0957 | 0.0052 | 0.3 | 0.7 |
| EXAMPLE 3 | 0.0673 | 0.0278 | 0.0003 | 0.0007 | 0.0962 | 0.0104 | 0.3 | 1.5 |
| EXAMPLE 4 | 0.0673 | 0.0278 | 0.0003 | 0.0009 | 0.0964 | 0.0130 | 0.3 | 1.9 |
| EXAMPLE 5 | 0.0673 | 0.0278 | 0.0001 | 0.0001 | 0.0954 | 0.0026 | 1.0 | 0.4 |
| EXAMPLE 6 | 0.0674 | 0.0278 | 0.0002 | 0.0002 | 0.0957 | 0.0052 | 1.0 | 0.8 |
| EXAMPLE 7 | 0.0674 | 0.0278 | 0.0005 | 0.0005 | 0.0962 | 0.0104 | 1.0 | 1.7 |
| EXAMPLE 8 | 0.0673 | 0.0278 | 0.0006 | 0.0006 | 0.0964 | 0.0130 | 1.0 | 2.1 |
| EXAMPLE 9 | 0.0674 | 0.0278 | 0.0002 | 0.0001 | 0.0954 | 0.0026 | 3.0 | 0.5 |
| EXAMPLE 10 | 0.0673 | 0.0278 | 0.0004 | 0.0001 | 0.0957 | 0.0052 | 3.0 | 0.9 |
| EXAMPLE 11 | 0.0673 | 0.0278 | 0.0007 | 0.0003 | 0.0962 | 0.0104 | 3.0 | 1.8 |
| EXAMPLE 12 | 0.0673 | 0.0278 | 0.0009 | 0.0003 | 0.0964 | 0.0130 | 3.0 | 2.3 |
| EXAMPLE 13 | 0.0673 | 0.0278 | 0.0001 | 0.0002 | 0.0954 | 0.0026 | 0.3 | 0.4 |
| EXAMPLE 14 | 0.0673 | 0.0278 | 0.0001 | 0.0002 | 0.0954 | 0.0026 | 0.3 | 0.4 |
| COMPARATIVE EXAMPLE 1 | 0.1346 | 0.0557 | 0.0001 | 0.0000 | 0.1905 | 0.0008 | — | 0.1 |
| COMPARATIVE EXAMPLE 2 | 0.0673 | 0.0278 | 0.0010 | 0.0000 | 0.0962 | 0.0104 | — | 2.0 |
| COMPARATIVE EXAMPLE 3 | 0.0673 | 0.0278 | 0.0004 | 0.0011 | 0.0967 | 0.0155 | 0.3 | 2.2 |
| COMPARATIVE EXAMPLE 4 | 0.0673 | 0.0278 | 0.0008 | 0.0007 | 0.0967 | 0.0155 | 1.0 | 2.5 |
| COMPARATIVE EXAMPLE 5 | 0.0673 | 0.0278 | 0.0011 | 0.0004 | 0.0967 | 0.0155 | 3.0 | 2.7 |
| COMPARATIVE EXAMPLE 6 | 0.0674 | 0.0278 | 0.0000 | 0.0002 | 0.0954 | 0.0020 | 0.0 | 0.3 |
| COMPARATIVE EXAMPLE 7 | 0.0673 | 0.0278 | 0.0001 | 0.0002 | 0.0954 | 0.0026 | 0.3 | 0.4 |
| COMPARATIVE EXAMPLE 8 | 0.0673 | 0.0278 | 0.0001 | 0.0002 | 0.0954 | 0.0026 | 0.3 | 0.4 |

TABLE 3

|  | σ 1k (emu/g) | BET specific surface area (m²/g) | AD (g/ml) | Roughness Rz (μm) | Crystal size variation σ | Core charge amount (μC/g) | Strength (%) |
|---|---|---|---|---|---|---|---|
| EXAMPLE 1 | 62.2 | 0.135 | 2.27 | 2.8 | 2.8 | 18.4 | 0.9 |
| EXAMPLE 2 | 57.2 | 0.144 | 2.21 | 3.2 | 2.5 | 18.7 | 0.7 |
| EXAMPLE 3 | 56.2 | 0.155 | 2.21 | 4.0 | 2.3 | 19.8 | 0.5 |
| EXAMPLE 4 | 48.6 | 0.207 | 2.09 | 4.6 | 1.8 | 17.3 | 0.6 |
| EXAMPLE 5 | 62.6 | 0.088 | 2.28 | 2.8 | 2.6 | 19.3 | 0.8 |
| EXAMPLE 6 | 62.4 | 0.105 | 2.30 | 3.5 | 2.3 | 19.3 | 0.6 |
| EXAMPLE 7 | 53.2 | 0.132 | 2.22 | 4.3 | 1.8 | 20.2 | 0.4 |
| EXAMPLE 8 | 46.5 | 0.182 | 2.12 | 4.6 | 1.2 | 18.5 | 0.8 |
| EXAMPLE 9 | 63.3 | 0.065 | 2.30 | 3.2 | 2.3 | 20.2 | 0.4 |
| EXAMPLE 10 | 54.9 | 0.102 | 2.25 | 3.5 | 2.0 | 20.3 | 0.6 |
| EXAMPLE 11 | 51.2 | 0.145 | 2.25 | 4.1 | 1.6 | 23.2 | 0.6 |
| EXAMPLE 12 | 46.2 | 0.175 | 2.14 | 4.7 | 1.2 | 19.7 | 0.7 |
| EXAMPLE 13 | 65.6 | 0.135 | 2.26 | 2.6 | 2.8 | 16.5 | 0.9 |
| EXAMPLE 14 | 55.2 | 0.137 | 2.27 | 2.7 | 2.8 | 17.2 | 0.9 |
| COMPARATIVE EXAMPLE 1 | 65.7 | 0.140 | 2.28 | 1.7 | 3.5 | 16.1 | 1.1 |
| COMPARATIVE EXAMPLE 2 | 59.7 | 0.182 | 2.22 | 2.0 | 4.2 | 16.4 | 1.5 |
| COMPARATIVE EXAMPLE 3 | 47.2 | 0.218 | 2.08 | 5.3 | 1.1 | 13.0 | 1.2 |
| COMPARATIVE EXAMPLE 4 | 44.8 | 0.211 | 2.10 | 5.5 | 1.0 | 11.7 | 1.5 |
| COMPARATIVE EXAMPLE 5 | 43.0 | 0.172 | 2.17 | 5.5 | 0.9 | 13.2 | 1.3 |
| COMPARATIVE EXAMPLE 6 | 63.2 | 0.121 | 2.38 | 1.1 | 4.5 | 16.2 | 2.2 |
| COMPARATIVE EXAMPLE 7 | 67.7 | 0.136 | 2.26 | 1.8 | 3.3 | 13.1 | 1.5 |
| COMPARATIVE EXAMPLE 8 | 42.5 | 0.138 | 2.27 | 2.5 | 2.9 | 16.3 | 1.3 |

TABLE 4

| | charge amount (μC/g) | | | image quality | | |
|---|---|---|---|---|---|---|
| | 0k (prints) | 100k (prints) | 200k (prints) | 0k (prints) | 100k (prints) | 200k (prints) |
| EXAMPLE 1 | 23 | 22 | 21 | ◎ | ◎ | ◎ |
| EXAMPLE 2 | 23 | 22 | 21 | ◎ | ◎ | ◎ |
| EXAMPLE 3 | 24 | 22 | 19 | ◎ | ◎ | ○ |
| EXAMPLE 4 | 23 | 20 | 15 | ◎ | ○ | ○ |
| EXAMPLE 5 | 22 | 22 | 20 | ◎ | ◎ | ◎ |
| EXAMPLE 6 | 23 | 21 | 19 | ◎ | ◎ | ◎ |
| EXAMPLE 7 | 23 | 20 | 18 | ◎ | ◎ | ○ |
| EXAMPLE 8 | 24 | 21 | 16 | ◎ | ◎ | ○ |
| EXAMPLE 9 | 24 | 22 | 19 | ◎ | ◎ | ◎ |
| EXAMPLE 10 | 24 | 23 | 18 | ◎ | ◎ | ○ |
| EXAMPLE 11 | 23 | 22 | 18 | ◎ | ◎ | ○ |
| EXAMPLE 12 | 23 | 18 | 15 | ◎ | ○ | ○ |
| EXAMPLE 13 | 23 | 22 | 20 | ◎ | ◎ | ○ |
| EXAMPLE 14 | 23 | 23 | 21 | ◎ | ◎ | ◎ |
| COMPARATIVE EXAMPLE 1 | 23 | 15 | 3 | ◎ | ○ | X |
| COMPARATIVE EXAMPLE 2 | 22 | 17 | 5 | ◎ | △ | X |
| COMPARATIVE EXAMPLE 3 | 23 | 10 | 5 | ◎ | △ | X |
| COMPARATIVE EXAMPLE 4 | 23 | 15 | 9 | ◎ | ○ | △ |
| COMPARATIVE EXAMPLE 5 | 22 | 6 | 3 | ◎ | ○ | X |
| COMPARATIVE EXAMPLE 6 | 22 | 13 | 2 | ◎ | △ | X |
| COMPARATIVE EXAMPLE 7 | 13 | 6 | 2 | ○ | X | X |
| COMPARATIVE EXAMPLE 8 | 23 | 17 | 10 | ○ | ○ | X |

What is claimed is:

1. Carrier core particles for electrophotographic developer including manganese and iron as a core composition, wherein
the core composition includes strontium and calcium,
the roughness Rz of crystals formed is 2.6 μm to 5.2 μm, and
the variation σ in crystal size is 1.2 to 2.8, wherein the molar ratio of the sum of strontium and calcium to the sum of manganese, iron, strontium, and calcium is 0.0026 to 0.013.

2. The carrier core particles for electrophotographic developer according to claim 1, wherein
the magnetization of the carrier core particles in an external magnetic field of 1000 (1 k) Oe (oersted) is 46 emu/g or higher.

3. Carrier for electrophotographic developer used in electrophotographic developer, comprising:
carrier core particles for electrophotographic developer cited in claim 1; and
resin that coats the surface of the carrier core particles for electrophotographic developer.

4. Electrophotographic developer used to develop electrophotographic images, comprising:
carrier for electrophotographic developer cited in claim 3; and
toner that can be triboelectrically charged by frictional contact with the carrier for development of electrophotographic images.

5. The carrier core particles for electrophotographic developer according to claim 1, wherein the molar ratio of the strontium to the calcium is 0.3 to 3.0.

6. The carrier core particles for electrophotographic developer according to claim 1, wherein the carrier core particles made by the steps of:
granulating a mixture of a raw material containing manganese, a raw material containing iron, a raw material containing strontium, and a raw material containing calcium;
firing the granular mixture, the firing step including heating the granular mixture with an increase in temperature to a predetermined degree; and
cooling the granular mixture, after the heating process, in an atmosphere with an oxygen concentration ranging from 5000 ppm to 20000 ppm.

7. The carrier core particles for electrophotographic developer according to claim 1, wherein the core composition contains manganese, iron, strontium, calcium, and oxygen.

* * * * *